United States Patent
King

(10) Patent No.: US 7,591,183 B2
(45) Date of Patent: Sep. 22, 2009

(54) GAS TURBINE ENGINE WITH A PLURALITY OF BLEED VALVES

(75) Inventor: Dennis M King, Derby (GB)

(73) Assignee: Rolls-Royce PLC, London (GB)

( * ) Notice: Subject to any disclaimer, the term of this patent is extended or adjusted under 35 U.S.C. 154(b) by 213 days.

(21) Appl. No.: 11/499,809

(22) Filed: Aug. 7, 2006

(65) Prior Publication Data

US 2007/0056376 A1 Mar. 15, 2007

(30) Foreign Application Priority Data

Sep. 13, 2005 (GB) ................ 0518659.8

(51) Int. Cl.
*G01N 29/00* (2006.01)
*F02B 77/00* (2006.01)

(52) U.S. Cl. .................... 73/660; 123/198 D

(58) Field of Classification Search .......... 73/658–660, 73/587, 583, 579, 584, 585, 593; 123/198 D, 123/466

See application file for complete search history.

(56) References Cited

U.S. PATENT DOCUMENTS

| 4,051,829 | A | * | 10/1977 | Durham ................... 123/198 D |
| 4,060,979 | A | * | 12/1977 | Elsaesser et al. .............. 60/773 |
| 4,537,277 | A | * | 8/1985 | Bryce ......................... 181/214 |
| 4,543,830 | A | | 10/1985 | Stephens |
| 4,627,789 | A | * | 12/1986 | Petro et al. ..................... 415/28 |
| 4,967,550 | A | * | 11/1990 | Acton et al. ................... 60/794 |
| 5,385,012 | A | * | 1/1995 | Rowe ........................... 60/779 |
| 5,684,718 | A | | 11/1997 | Jenkins et al. |
| 5,706,651 | A | * | 1/1998 | Lillibridge et al. ............ 60/262 |
| 5,710,715 | A | | 1/1998 | Shitanda |
| 5,782,603 | A | * | 7/1998 | O'Brien et al. ................. 415/1 |
| 5,811,683 | A | | 9/1998 | Yoshioka et al. |
| 5,943,856 | A | * | 8/1999 | Lillibridge et al. ............ 60/262 |
| 6,695,578 | B2 | * | 2/2004 | Winslow et al. ............. 415/145 |
| 2003/0225492 | A1 | * | 12/2003 | Cope et al. ..................... 701/35 |

FOREIGN PATENT DOCUMENTS

| DE | 198 19 499 A1 | 11/1999 |
| DE | 101 32 067 A1 | 1/2003 |
| EP | 0 466 633 A2 | 1/1992 |
| FR | 2 846 090 A1 | 4/2004 |
| GB | 2 089 986 A | 6/1982 |
| WO | WO 02/03041 | 1/2002 |
| WO | WO 2004/017038 A1 | 2/2004 |

* cited by examiner

*Primary Examiner*—Helen C. Kwok
(74) *Attorney, Agent, or Firm*—Oliff & Berridge, PLC

(57) ABSTRACT

A health monitoring apparatus for a mechanical system includes: a microphone arranged to receive sound from the system; and a processor adapted to process the output of the microphone. The mechanical system may be a gas turbine engine. Further, the engine may have a plurality of bleed valves, each of the bleed valves being configured such that, when open, it produces a sound which is distinguishable from the sounds produced by the other bleed valves, and the microphone being arranged to detect the sound from the bleed valves.

17 Claims, 15 Drawing Sheets
(14 of 15 Drawing Sheet(s) Filed in Color)

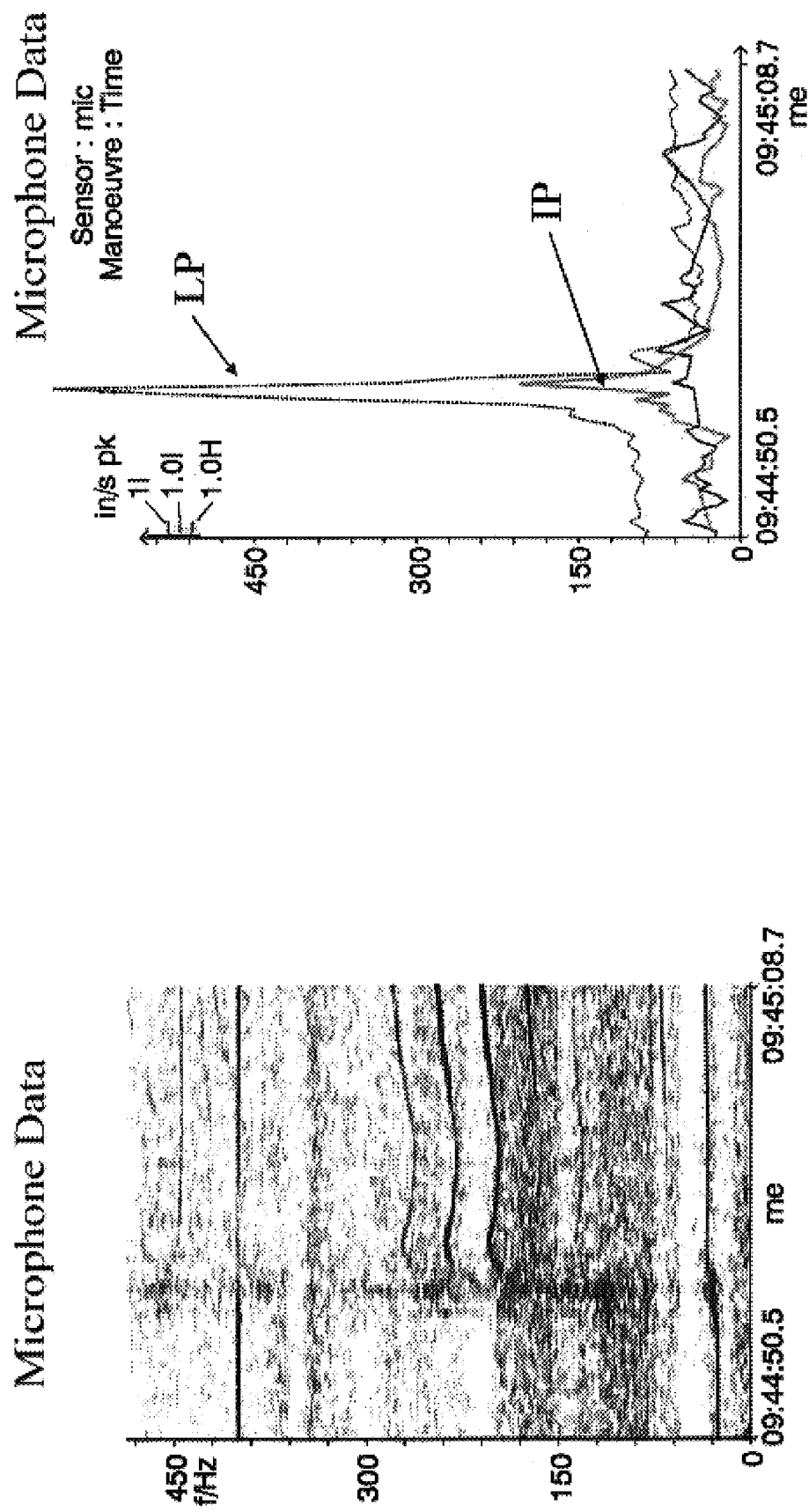

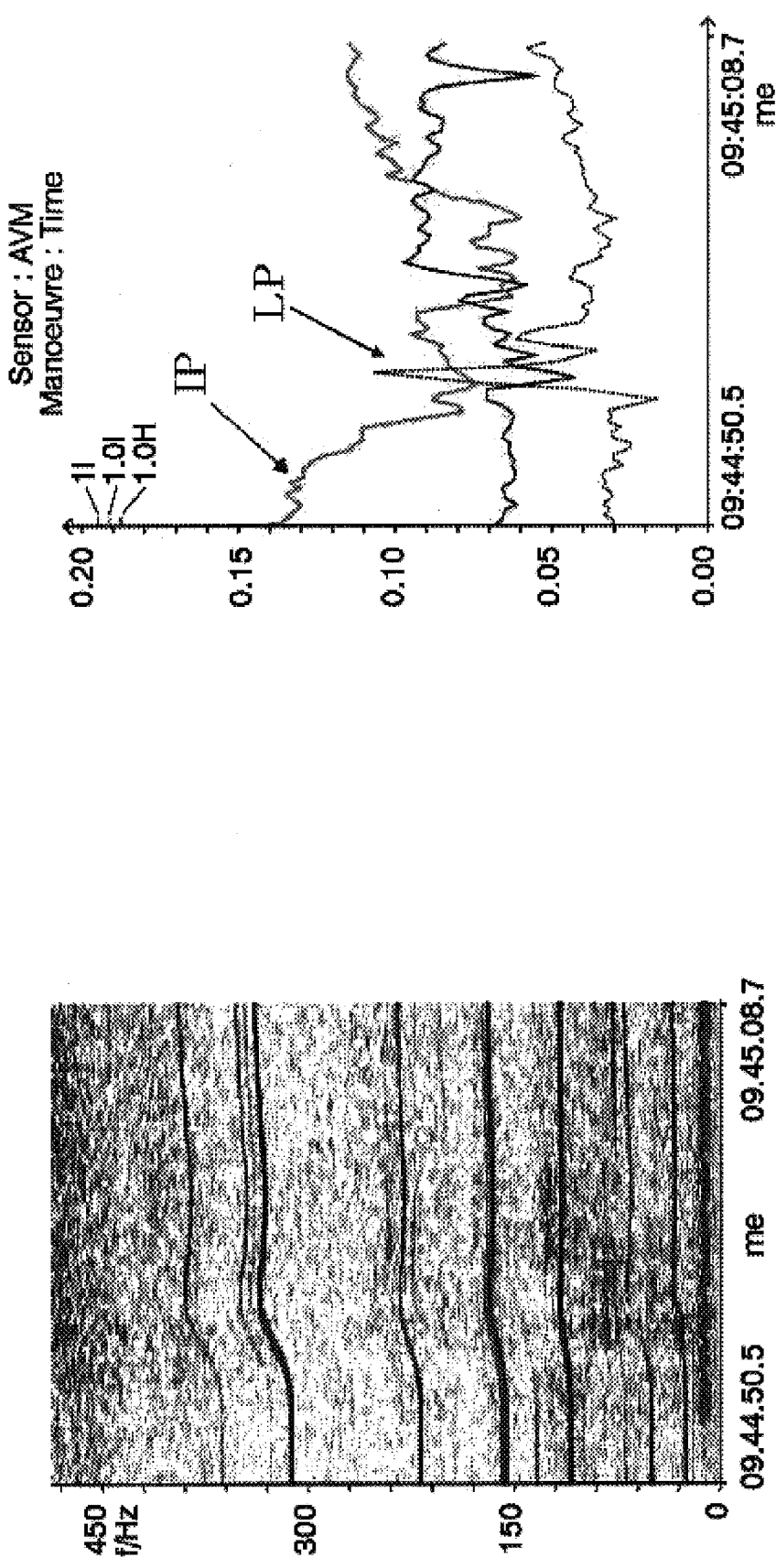

GAS TURBINE ENGINE WITH A PLURALITY OF BLEED VALVES

BACKGROUND

The present invention relates to apparatuses and methods for monitoring the health of a mechanical system. The invention is particularly, but not exclusively concerned with the monitoring of the health of a complex mechanical system, and especially power plant, including for example gas turbine, spark ignition and compression ignition internal combustion engines.

The health of a system can be considered a measure of the condition of a system against expected norms. A healthy system is one whose condition closely matches expectations, whereas an unhealthy system is one whose condition differs from what would be expected, indicating for example deterioration of, or a possible problem with the system. The ability to monitor the health of a system can therefore allow such deterioration and/or problems to be detected and, if necessary, addressed at an early stage.

For example, U.S. Pat. No. 5,684,718 describes a non-real time system for monitoring the operation of an electric generator in which vibration and load data are combined to produce a single signal which is then compared with stored data representative of maximum acceptable combinations of the two parameters. Essentially the system is an automated "look up table" which issues warnings when vibrations have exceeded acceptable limits.

In order to determine the condition, and consequently health, of a system, it is normal to monitor and analyse a series of measurable indicators which themselves reflect aspects of the condition of the system. For instance, taking the example of a gas turbine, one might monitor performance parameters such as turbine and compressor operating temperatures and pressures and spool speeds. To obtain a fuller overall picture of the engine's condition, these performance parameters can be supplemented with further condition indicators including, for example, vibration measurements and measurements of the particulate material entrained in the circulating oil.

Particularly with complex mechanical systems such as gas turbines, the number of indicators that must be monitored to obtain a useful overall picture of the system's condition can be high. This in turn means that the task of analysing the complete series of indicators to determine the health of the engine is a complex one, typically requiring a skilled expert to analyse the data off-line.

WO02/03041 describes methods for monitoring the health of a system such as a gas turbine engine using performance data and vibration data acquired from analogue vibration transducers connected to the engine. An embodiment of the method disclosed has been implemented in the QUICK™ system produced by Oxford Biosignals Ltd. of Oxford, UK.

Existing airborne/aircraft vibration monitoring (AVM) systems also use vibration data acquired from vibration transducers or accelerometers connected to the engine components which are desired to be monitored. Whilst such systems provide useful information from the vibration of the various components of the engines to which transducers are attached, they do not provide a general picture of the engine as a whole and are thus less capable of detecting unusual features such as fan flutter, bird ingestion, stall, ice shedding, etc.

Although it is acknowledged that a skilled test-bed engineer with many years' experience can often identify a fault with an engine by listening to the sounds produced by the engine, the use of a microphone to provide data for engine health monitoring has not previously been seriously considered due to the perceived difficulties in obtaining useful information from a system that is inherently noisy. Furthermore, in the case of gas turbine engines, in order to receive information from the engine, such a microphone would have to be mounted in an airflow that is travelling at several hundred miles per hour and would also be subject to effects from fan blade passing.

SUMMARY

However, the present inventors have surprisingly discovered that useful information can be obtained from a microphone mounted so as to record the sound output from a mechanical system, and particularly an engine.

One particular aspect of gas turbine engines has proved difficult to accurately monitor in operation. This is the operation and performance of the bleed valves used to vent excess pressure from the compressor side of the engine and prevent surging. Often the operation and performance of the bleed valves is monitored indirectly by monitoring the outlet temperature.

A first aspect of the present invention provides a health monitoring apparatus for a mechanical system, the apparatus including a microphone arranged to receive sound from the system, and a processor adapted to process the output of the microphone.

Preferably the system is an engine, and in particular the engine may be a gas turbine engine, such as an aero gas turbine engine. However, the system may be another aircraft system, such as the undercarriage of an aircraft.

In embodiments where the system is a gas turbine engine, the microphone may be able to detect, and the processor recognise, unusual features such as fan flutter, bird ingestion, stall and the operation and performance of engine accessories, e.g. fuel pumps, hydraulic pumps, control units and generators.

The health monitoring apparatus of the present aspect may be used alongside known health monitoring apparatuses, and in particular may be used in conjunction with known AVM systems for monitoring the health of engines.

As well as independently monitoring the health of a system, the microphone of the present aspect can provide a useful addition to existing health monitoring systems by providing a generic transducer which is less specific than, for example, the vibration transducers used in AVM systems.

Suitable microphones for use in this aspect of the present invention are available relatively cheaply and so the overall increase in cost of adding a health monitoring apparatus according to the present aspect to an existing health monitoring apparatus will be low.

Where the system is a gas turbine engine, the microphone is preferably located in an under-cowl location.

Preferably the processor is adapted to filter random noise from the output of the microphone.

Preferably the processor is further adapted to analyse the output of the microphone. More preferably the processor is adapted to compare the output of the microphone with a model of the normal behaviour of the system. The processor may be further adapted to produce an alarm or alert if the output of the microphone deviates from the model by more than a pre-defined limit.

Preferably the processor also includes the features of the processors disclosed in WO02/03041, but with microphone data replacing vibration response data.

More preferably, the apparatus further comprises data acquisition means, which include the microphone, for acquiring a plurality of condition indicators from the system at each of a plurality of times, the condition indicators including (a) a plurality of noise measurements or (b) one or more noise measurements and one or more performance parameter measurements; processor means for constructing a condition signature for the present time from said condition indicators and for predicting, from condition indicators used to construct the condition signature for the previous time, a normal signature corresponding to the condition signature for a healthy system at the present time; comparator means for comparing the condition signature for the present time with the normal signature; and registration means for registering an event if the comparator indicates that the condition signature for the present time differs from the normal signature by more than a predetermined threshold.

Another aspect of the present invention provides an engine having a monitoring apparatus according to the above first aspect. The engine of the present aspect may include any combination of the preferred or optional features of the above first aspect. In embodiments of the present invention, the engine is a gas turbine engine.

Another aspect of the present invention provides an aircraft system with a characteristic operating sound, such as a retractable aircraft undercarriage or a movable control surface (e.g. a wing flap, tail flap or rudder), having a monitoring apparatus according to the above first aspect.

A further aspect of the present invention provides a method of monitoring the health of a mechanical system including the step of monitoring the output of a microphone arranged to receive the sound from that system.

Preferably the method of the present aspect uses an apparatus of the first aspect above to perform the monitoring. The apparatus may include any combination of the preferred or optional features of the above first aspect. In particular, the method may be applied to an engine such as a gas turbine engine. For example, the method may be used to monitor for compressor blade cracking or damage. The gas turbine engine is typically an aero engine, although the method may be applied to monitor the operation of other aircraft systems, such as the undercarriage of an aircraft.

Preferably the method includes the further step of processing the output of the microphone. Such processing may include one or more of: removal of random noise, filtering, calculation of power spectra, zmod data, spectrum analysis, tracked order extraction, amplitude and phase extraction, etc.

Preferably the method includes the further step of analysing the output of the microphone (which may occur before or after any further step of processing that output, or both).

The step of analysing the output of the microphone may include any of the standard methods used in vibration monitoring, particularly those used in AVM.

Preferably the step of analysing includes the step of comparing the output with a model of the normal behaviour of the system. More preferably the method includes the further step of generating an alarm or an alert if the output deviates from the model by more than a pre-defined limit.

More preferably the step of analysing includes using any one of the methods disclosed in WO02/03041, but with microphone data replacing vibration data.

Preferably the method comprises performing at each of a plurality of times the steps of: constructing a condition signature for the present time from a plurality of condition indicators including (a) a plurality of noise measurements acquired from the system or (b) one or more noise measurements and one or more performance parameter measurements acquired from the system; predicting, from condition indicators used to construct the condition signature for the previous time, a normal signature corresponding to the condition signature for a healthy system at the present time; comparing the condition signature for the present time with the normal signature; and registering an event if the condition signature for the present time differs from the normal signature by more than a predetermined threshold.

Preferably said times define successive intervals of at most 1 sec duration.

Preferably the normal signature is predicted from a model defining one or more inter-dependencies between said condition indicators used to construct the condition signature for the previous time.

Preferably the model is a learnt model. In particular, the model may comprise a neural network. More preferably the model comprises a matrix with one or more non-zero off-diagonal terms to define said interdependencies.

Preferably the step of comparing the condition signature with the normal signature involves calculating a value for the normalised innovations squared. More preferably the step of comparing the condition signature with the normal signature involves calculating a prediction error.

Preferably said measurements are synchronously acquired from the system to a synchronisation imprecision of at most 1 sec.

Another aspect of the present invention provides a gas turbine engine wherein the engine has a plurality of bleed valves, each of said bleed valves being configured such that, when open, it produces a sound which is distinguishable from the sounds produced by the other bleed valves.

The sound produced by each bleed valve may result from the "tuning" of the valve apertures themselves. Preferably, the engine includes noise generators arranged in the airflow produced when the bleed valves are open to produce the sound(s). The noise generators may include one or more of the following: tuned pipes (with open or closed distal ends), resonance chambers, reed arrangements, or vibrating members.

Preferably the engine further includes a monitoring system for the gas turbine engine including a microphone arranged to detect the sound produced by said bleed valves. The monitoring system is preferably a health monitoring apparatus such as that in the first aspect above, including any combination of the optional and preferred features of that aspect.

The microphone of the monitoring system of the present aspect may be specifically mounted to monitor the sound produced by the bleed valves, or may be a microphone that is used to monitor the overall health of the engine.

Preferably the sound produced by each bleed valve is a tone of substantially uniform pitch, with or without associated harmonics.

A further aspect of the present invention provides a method for monitoring the operation of one or more bleed valves in a gas turbine engine, wherein the engine has a plurality of bleed valves, each of said bleed valves being configured such that, when open, it produces a sound which is distinguishable from the sounds produced by the other bleed valves, the method including detecting the sound produced by said bleed valves using a microphone.

Preferably the engine to which the method of the present aspect is applied is an engine according to the previous aspect of the invention, and may include any combination of the preferred or optional features of that aspect.

The method of the present aspect may also include any combination of the preferred or optional features of the previous method aspect described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described in relation to the accompanying figures, in which at least one figure is executed in colors in which:

FIGS. 8a and 8b are respectively a noise signature plot and a tracked order plot recorded using an embodiment of the present invention during an ice shedding manoeuvre;

FIGS. 9a and 9b are respectively a vibration signature plot and a tracked order plot recorded using standard engine AVM during an ice shedding manoeuvre;

DETAILED DESCRIPTION OF EMBODIMENTS

Figure 2:
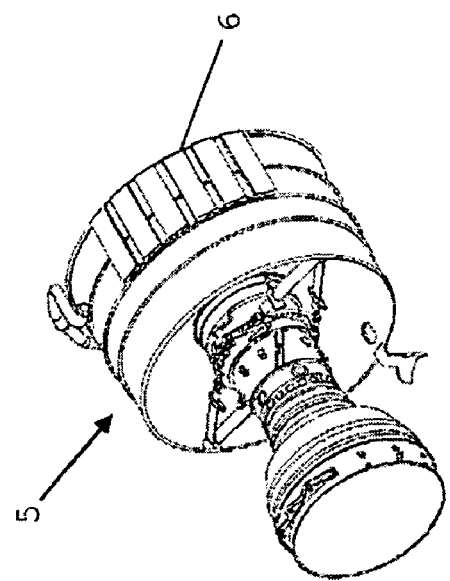
FIG. 2 is a isometric view of the embodiment of FIG. 1.
Figure 1:
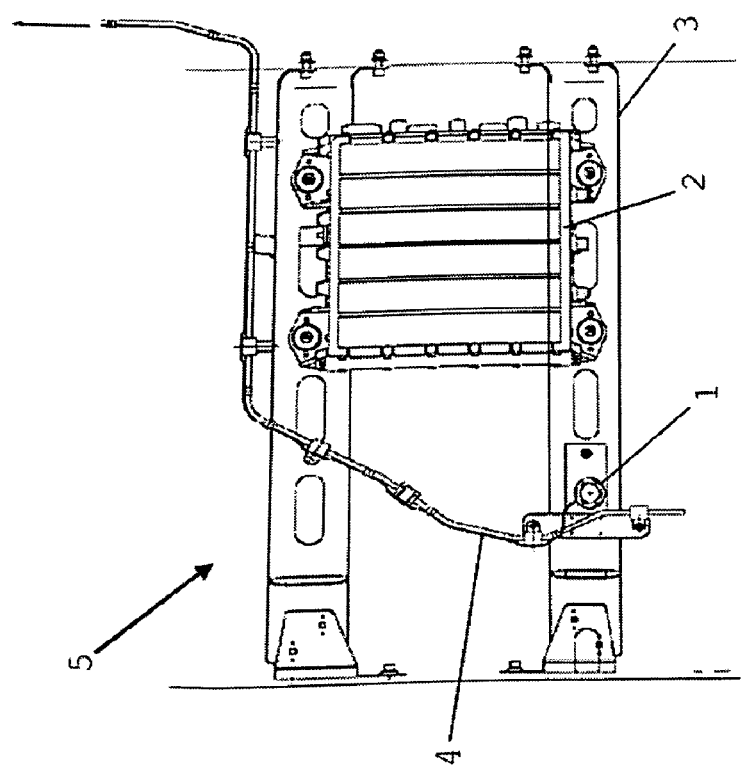
FIG. 1 is a plan view of an embodiment of the present invention.

An apparatus according to an embodiment of the present invention is shown in FIGS. 1 and 2.

FIG. 1 shows a button microphone 1 mounted on lower support rail 2 adjacent to the engine management unit (EMU) 3. All these components are located on the fan case 5.

The microphone used in this embodiment was a Type 4948 Surface Pressure Field Measurement Microphone manufactured by Brüel & Kjær of DK-2850 Nærum, Denmark. This microphone has a frequency response in the range of 5 Hz to 20 kHz, a dynamic range of 55 to 160 dB, a typical sensitivity of 1.4 mV/Pa, a vibration sensitivity of 65 dB for 1 m/s$^2$ axial vibration (<1 kHz), and an operating temperature range of −55° C. to +100° C. The microphone has a diameter of 20 mm and a height of 2.5 mm.

The skilled person will appreciate that other suitable microphones could be used in embodiments of the invention. Suitable microphones preferably provide detection of sound in the frequency range covering the range of human hearing, i.e. approximately 20 Hz to 20 kHz.

A pre-amplifier cable 4 connects the microphone 1 to the signal conditioner (not shown) located on the instrumentation panel 6 of the engine. In this embodiment, the pre-amplifier cable was a Type AO-0414 Pre-Amplifier Extension Cable from Brüel and Kjær having an operating temperature range of −20° C. to +80° C., and a 4 mm diameter, specifically adapted to connect to the signal conditioner.

The above microphone has a pre-amplifier provided in its cable, but microphones with integral pre-amplifiers can equally be used, or a pre-amplifier may be provided elsewhere in the apparatus.

The signal conditioner includes a Fylde FE-1817 twin channel amplifier module, supplied by Fylde Electronic Laboratories Ltd., Fylde Road, Preston, Lancashire, UK.

Recording and or further processing of the data from the microphone can be provided for in the usual manner of flight/engine telemetry.

In a particularly preferred embodiment, the data from the microphone is supplied to a health monitoring system of the learning type, such as that disclosed in WO02/03041, the contents of which are incorporated herein by reference. Such systems use a model of the normal behaviour of a system, which may be developed from monitoring of healthy running of the system, and check the input source against that model. Although the specific embodiments of WO02/03041 are applied to vibration data, the output from the microphone of the embodiments of the present invention can be monitored in a similar manner.

An apparatus according to the above embodiment was mounted in a Rolls-Royce Trent 900 engine mounted in the number 2 position of an Airbus A340 flying test bed, based in Toulouse, on a number of a test flights during April and May 2005. The results below show how the microphone surprisingly produced significant data relating to the operation of the engine in various phases of the flight, and how at least some of this data was not provided by the existing AVM system also installed on the engine.

All the data shown was obtained and recorded using the Quick™ system provided by Oxford BioSignals Ltd.

FIGS. 3, 4, 5, 6a, 7a, 8a, 9a, 10a, 11a, 12a, 13a, 14a, 15a and 16 are zmod or "waterfall" plots in which the Y axis represents the spectral frequency, the X axis represents time and intensity represents the spectral amplitude at a particular point.

FIGS. 6b, 8b, 9b, 10b, 11b, 12b, 13b, 14b and 15b show the tracked order plots for identified key components derived from the corresponding data shown in the corresponding zmod plots. FIG. 7b shows the tracked order vibration amplitude at each frequency derived at the cursor position from the corresponding data shown in FIG. 7a.

Figure 3:
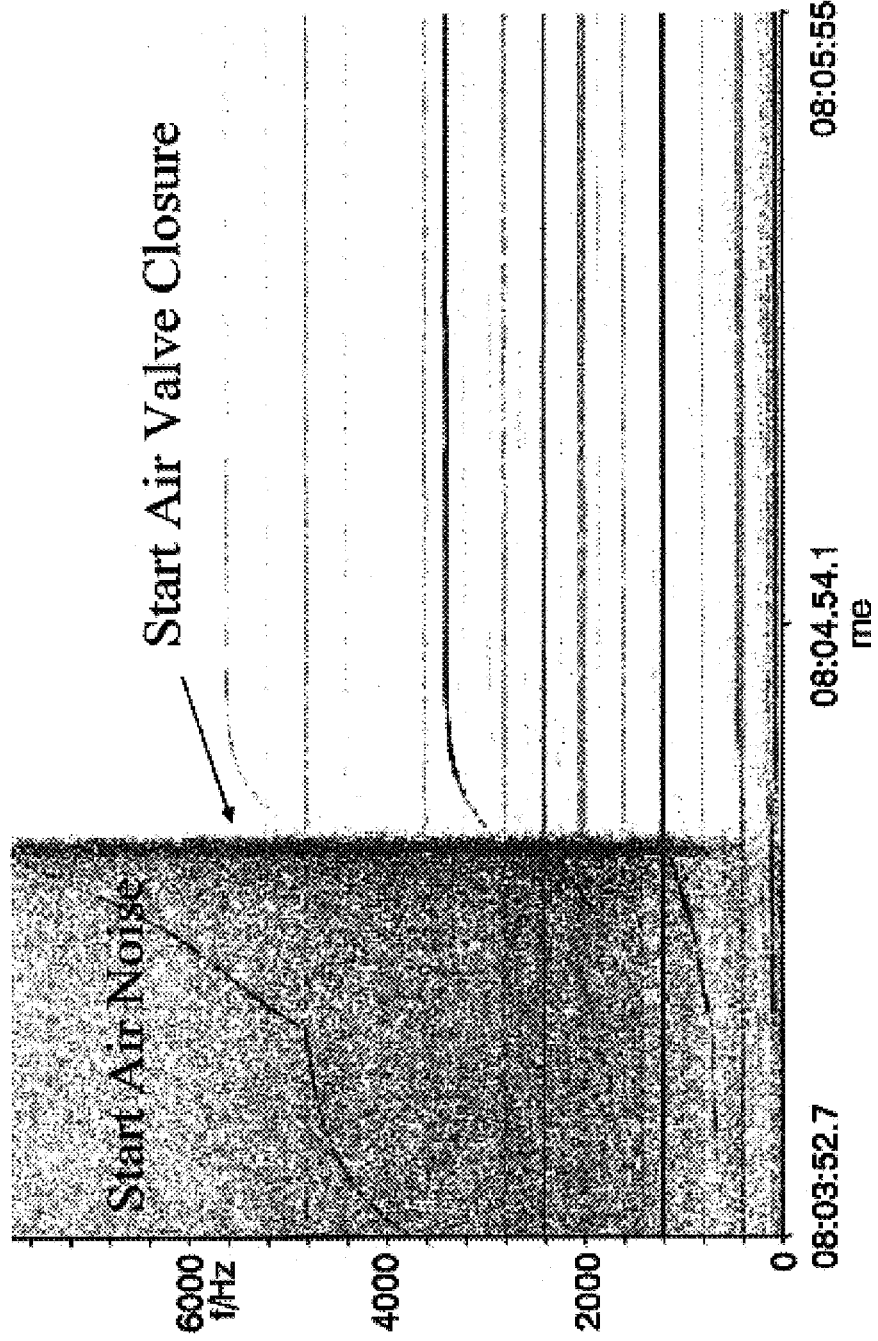
FIG. 3 is a noise signature plot recording using an embodiment of the present invention during engine start.

FIG. 3 shows the noise signature from the microphone in the 0 to 8000 Hz range during engine start to low idle on the ground. The random noise generated by the start air valve can be clearly seen in the region to the left of the plot, as can the point at which the start air valve was closed. Also visible are the gear passing tones (labelled 50 in FIG. 5) and generator signals at 400 Hz and harmonics thereof.

Figure 4:
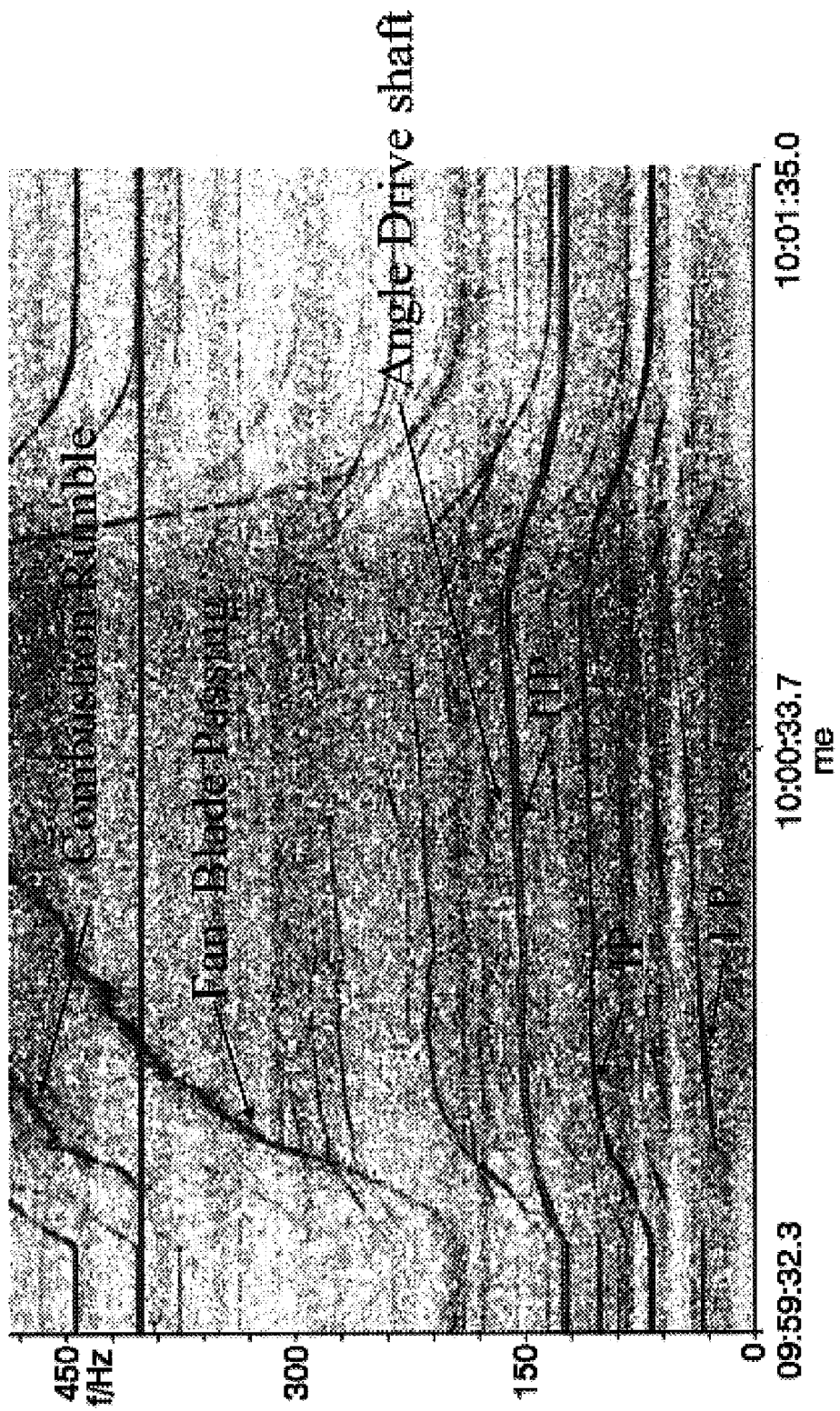
FIG. 4 is a noise signature plot recorded using an embodiment of the present invention during slow acceleration and deceleration.

FIG. 4 shows the recorded noise signature from the microphone in the 0 to 500 Hz ranges during a slow acceleration to power and a subsequent deceleration. No random noise filtration was used in obtaining the data shown.

Even without random noise filtration, traces relating to all three major rotating shafts (high pressure (HP), intermediate pressure (IP) and low pressure (LP)) are visible. Although the angle drive shaft (the drive shaft from the step-aside gearbox to the accessory gearbox—the drive to the step-aside gearbox being taken off the HP rotor, via the radial drive shaft) runs at a speed only approximately 2.5% faster than the HP shaft, it is still visible in FIG. 4 as a separate trace. Fan blade passing (at a frequency of 26 times the LP rotation) and combustion rumble are also visible.

Figure 5:
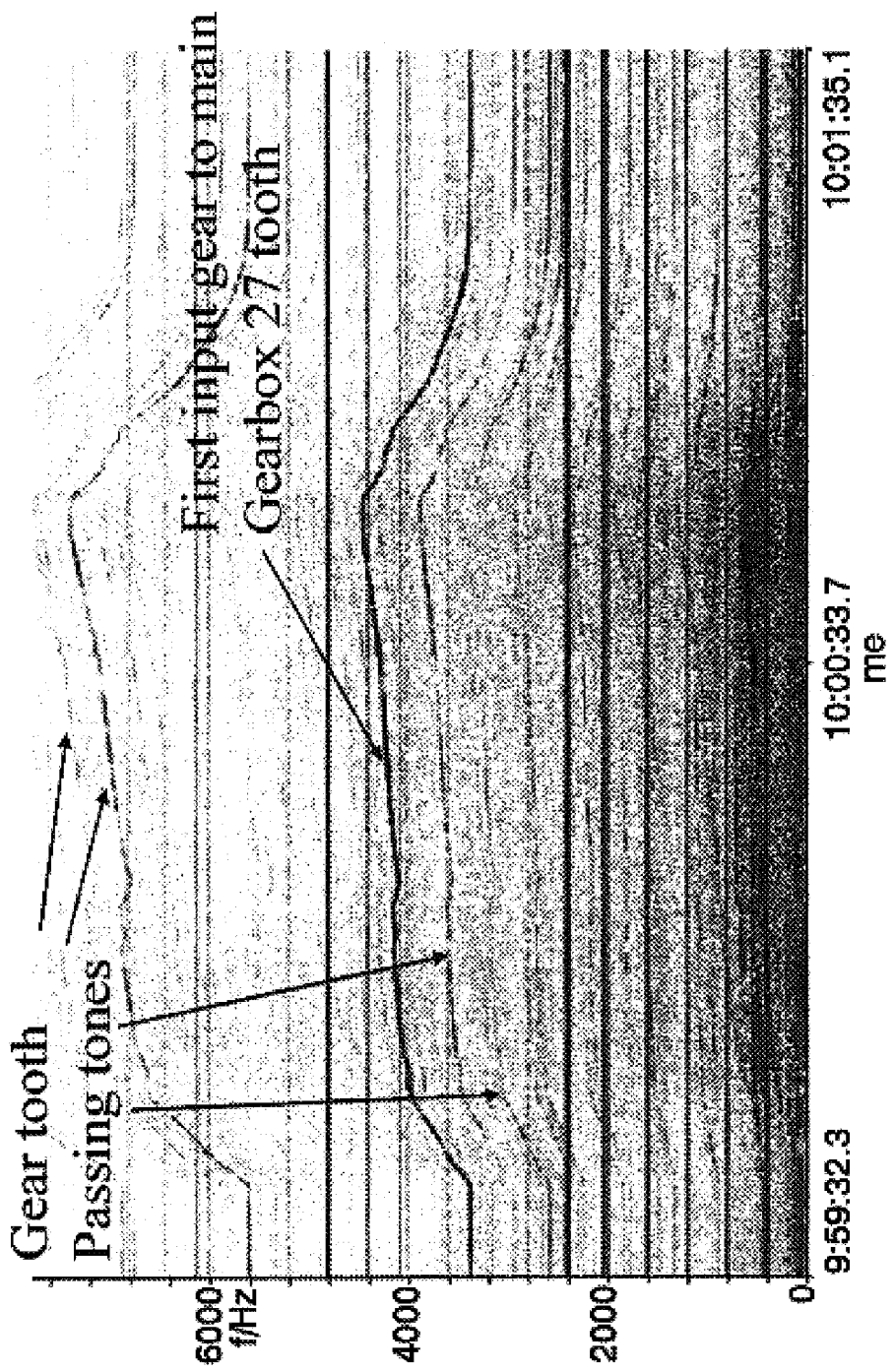
FIG. 5 is a noise signature plot recorded using an embodiment of the present invention during the same period as FIG. 4, covering a larger frequency range.

FIG. 5 shows the same noise signature as that in FIG. 4, but over the 0 to 8000 Hz range. The traces seen in FIG. 4 are hence compressed at the bottom of the plot, and the plot allows gear tooth passing tones to be distinguished.

Damage to a gear would show up on this plot as a strong first passing order, i.e. a tone appearing at the shaft rotational frequency times the number of gear teeth, together with sidebands consistent with the rotational frequency of the damaged gear.

The strong horizontal lines at 400 Hz intervals are caused by the 400 Hz aircraft mains generator, and are most likely derived from electrical noise rather than acoustic noise or mechanical vibration.

Figures 6A, 6B:
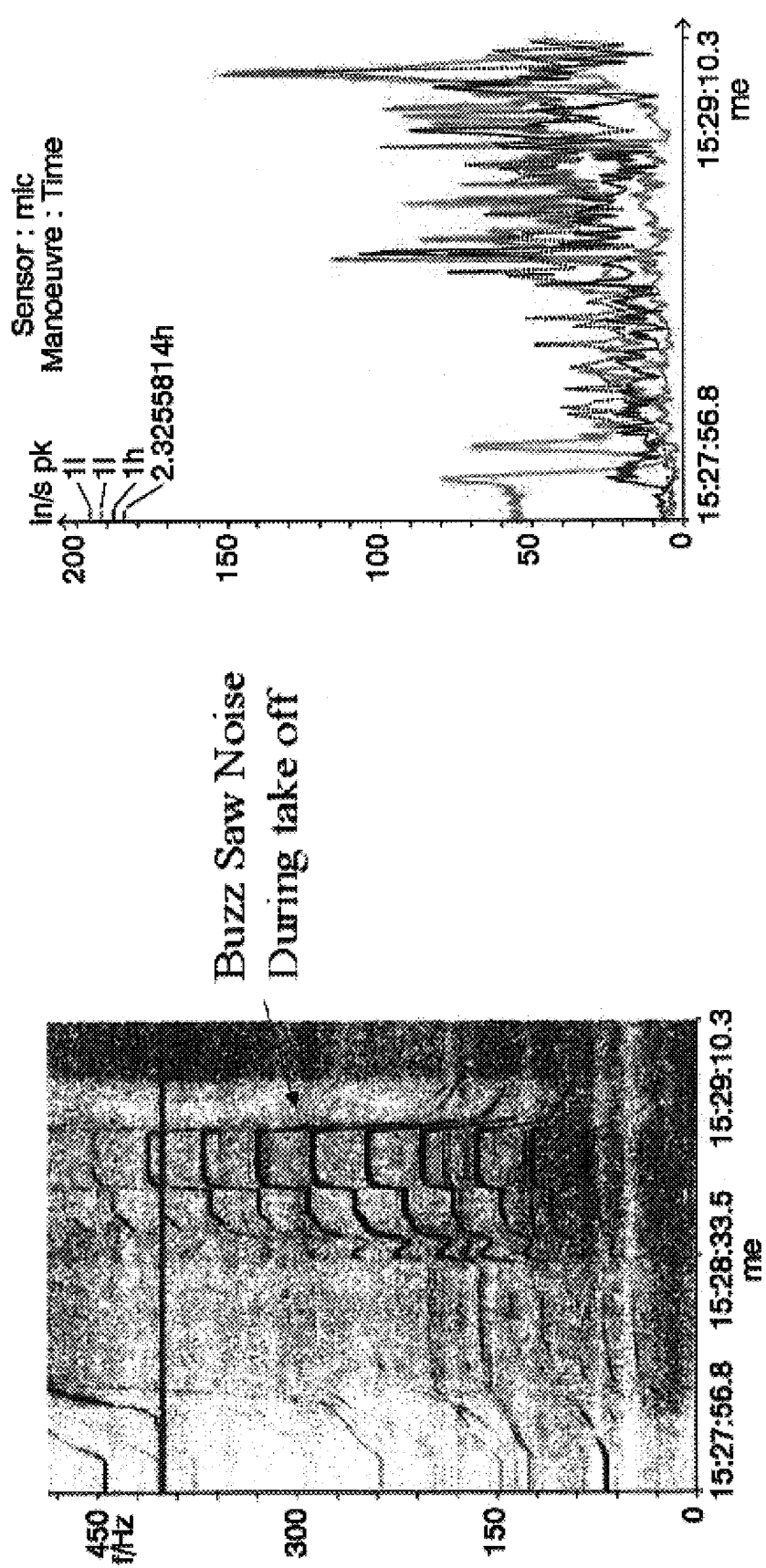
FIGS. 6a and 6b are respectively a noise signature plot and a tracked order plot recorded using an embodiment of the present invention during a take off roll and initial climb.
Figures 7A, 7B:
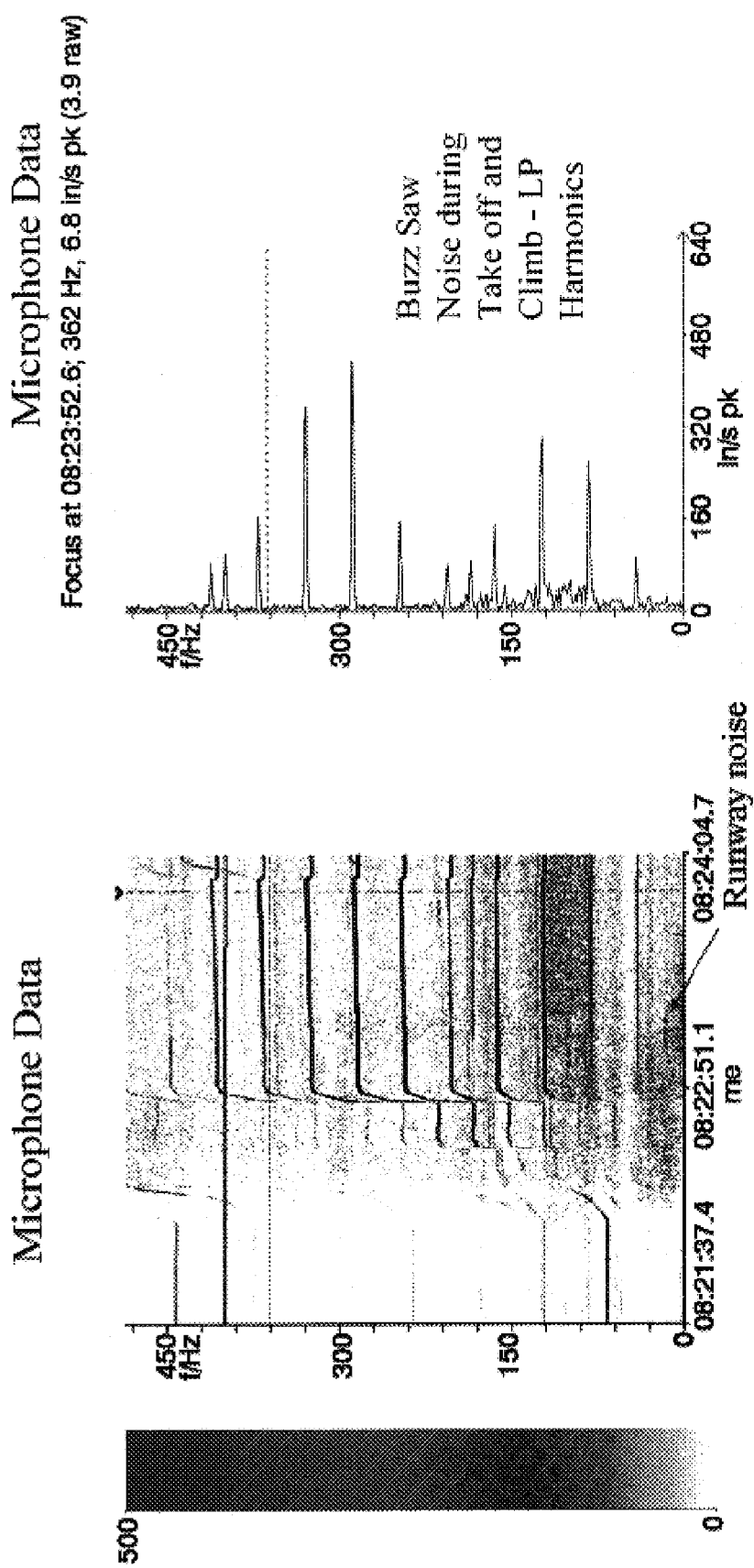
FIGS. 7a and 7b are respectively a noise signature plot and a frequency spectrum vibration plot recorded using an embodiment of the present invention during a take off roll and initial climb.

FIG. 6a shows the noise signature recorded by the microphone during a take-off roll and initial climb. The "buzz saw" noise (noise caused by the shock waves from fan blade tips moving at supersonic speeds) at higher engine powers is clearly visible in the middle of the plot. The harmonics of the LP rotation are a function of blade to blade variation in shape, and the magnitude of these tones reduces with increasing air speed and amplitude as the effective loads that cause the blades to lean and untwist reduce.

FIG. 7a shows a further noise signature recorded by the microphone during a take-off roll and initial climb. Again, the "buzz-saw" noise is visible, and in the tracked order vibration amplitude plot of FIG. 7b, the peaks of vibration at LP harmonic frequencies are evident. The relative amplitude of these peaks at the LP harmonics are characteristic of the individual fan set and thus provide a signature for the engine. If a blade was damaged (e.g. by a bird strike), then the characteristic signature/distribution of harmonic energy would change. Fan blades can be patterned (or re-patterned) to give different harmonic signatures.

FIGS. 8a to 15b relate to ice shedding manoeuvres. The normal procedure for engine testing for icing/ice shedding is to fly the aircraft to a suitable cloud and fly with the engine set at relatively low power to allow ice to build up on the engine, particularly on the fan blades and spinner. A subsequent acceleration of the engine to high power causes the ice to shed from the nose cone and fan blades.

For the manoeuvre monitored in FIGS. 8a and 8b, the flight conditions were as follows: Air speed 180 to 195 knots; Altitude 16500 to 17000 feet; NL (low pressure rotor rotational speed) 51 to 90%; T20 (air temperature entering the engine, measured at the engine inlet) 267 K.

FIG. 8a shows the noise signature recorded by the microphone during this ice shedding manoeuvre. FIG. 8b shows that some of the ice shed in this example has also entered the IP compressor, as indicated by the small spike in IP noise a short period of time after the LP noise spike.

For comparison, FIGS. 9a and 9b show data obtained from the engine AVM during the same manoeuvre as recorded in FIGS. 8a and 8b. Although the change in LP vibration can be seen in FIG. 9b, there is no visible response in the IP vibration. This is because the ice impacting the IP system applies an even load around the compressor and so does not generate a first order response.

Comparison of FIGS. 8b and 9b show one potential advantage of using a microphone in health monitoring alongside existing AVM systems.

FIGS. 10a, 10b, 11a and 11b show similar comparisons between the data recorded by the microphone and that recorded by the engine's AVM system during an in-flight ice-shedding at constant power.

Figure 10B:
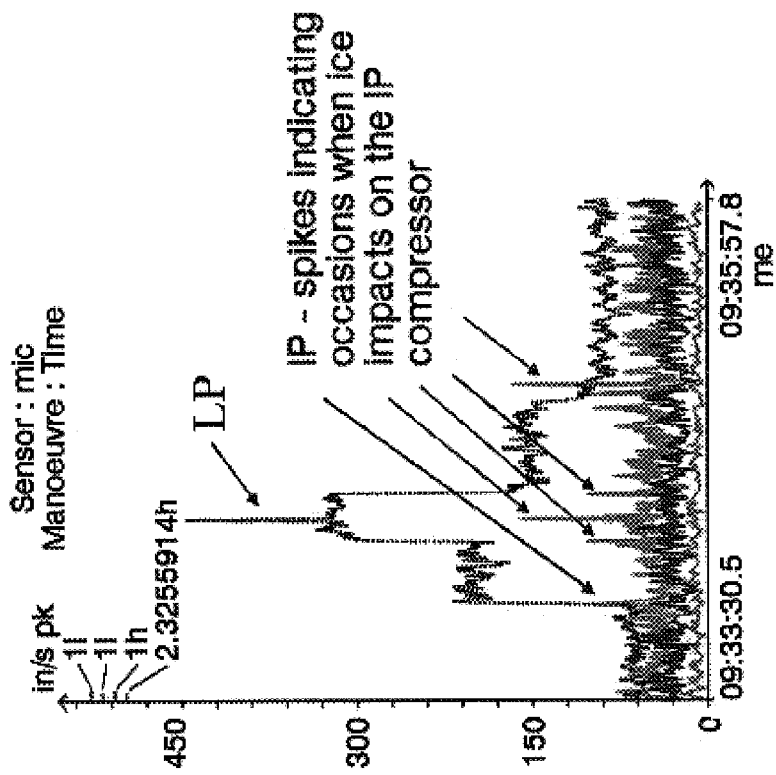
FIGS. 10a and 10b are respectively a noise signature plot and a tracked order plot recorded using an embodiment of the present invention during a further ice shedding manoeuvre.
Figure 10A:
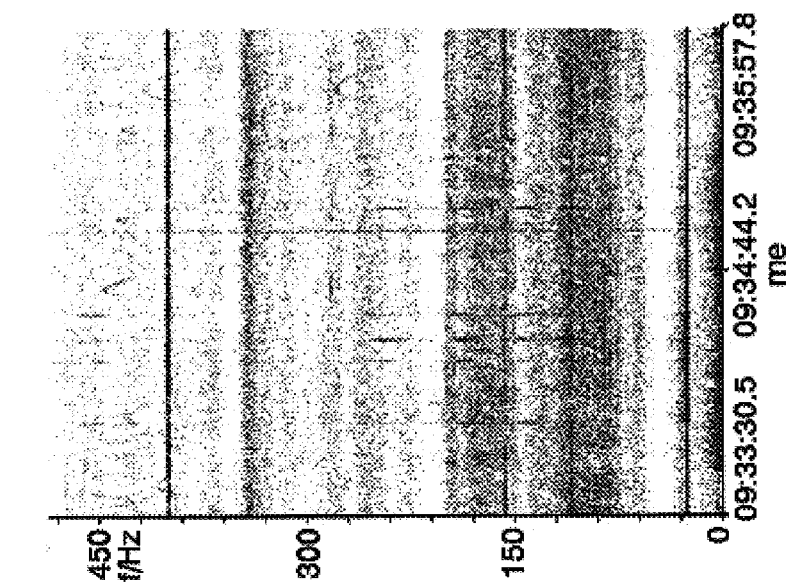
Figures 11A, 11B:
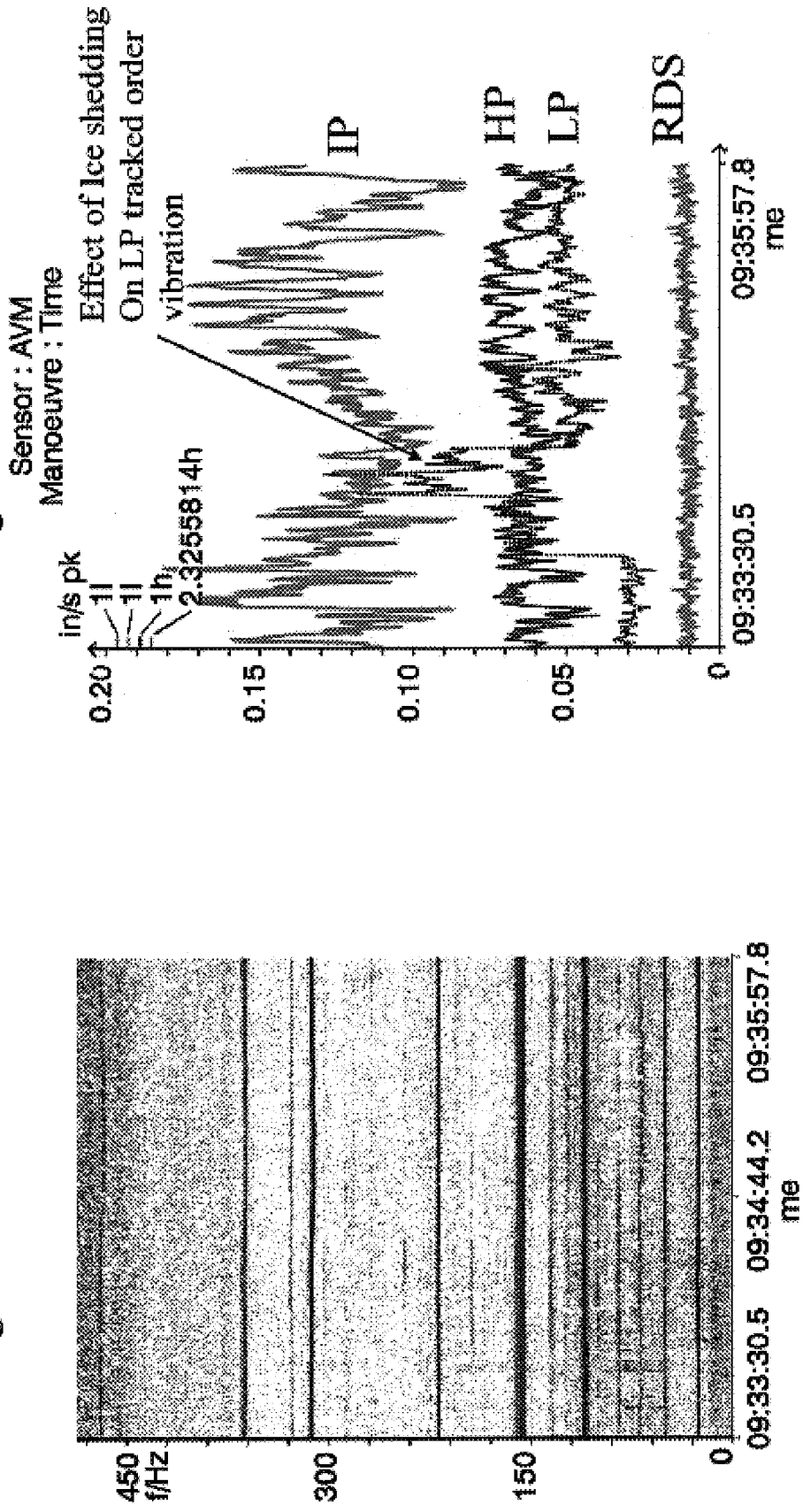
FIGS. 11a and 11b are respectively a noise signature plot and a tracked order plot recorded using standard engine AVM during the ice shedding manoeuvre shown in FIGS. 10a and 10b.
Figures 12A, 12B:
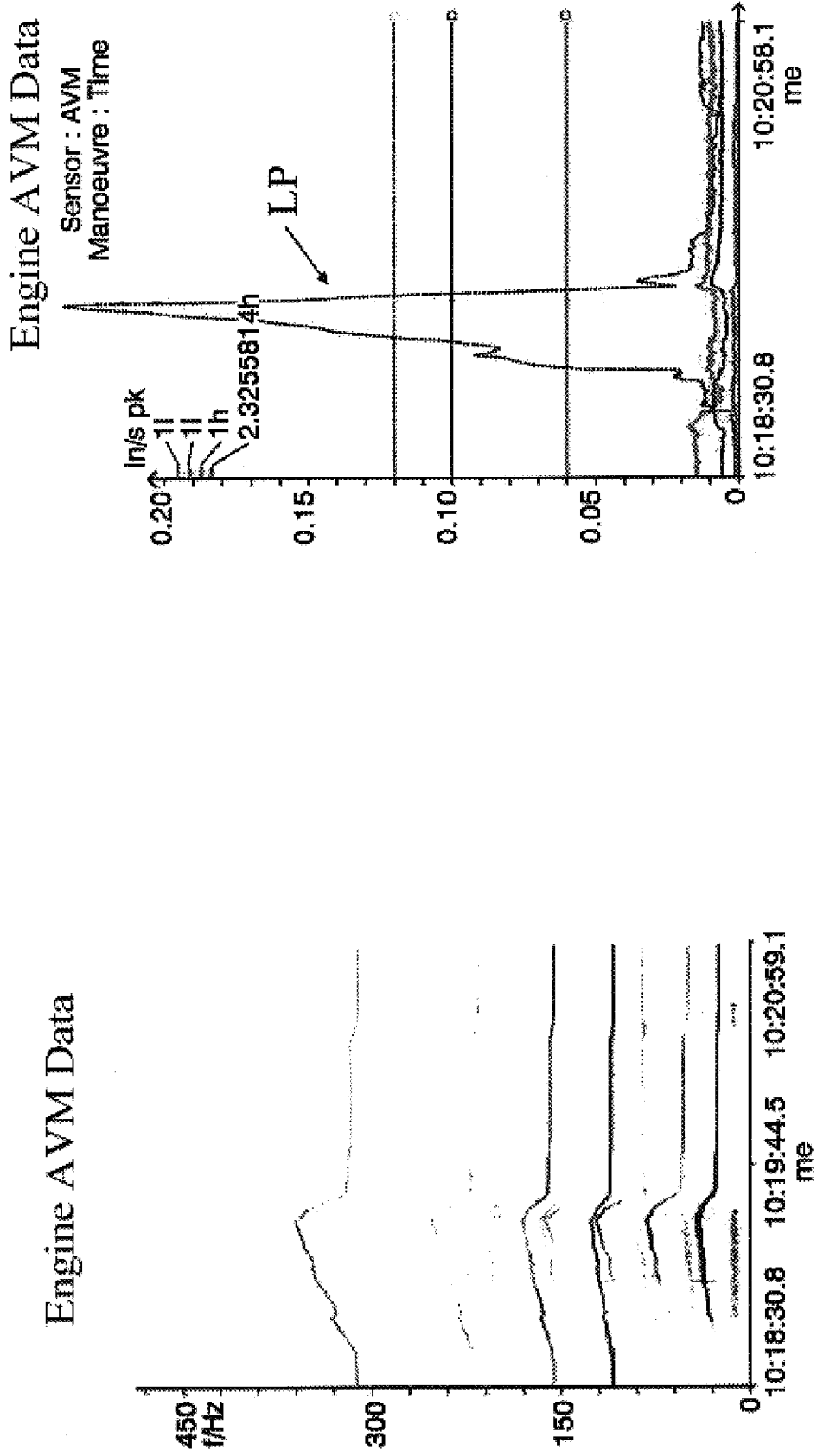
FIGS. 12a and 12b are respectively a vibration signature plot and a tracked order plot recorded using the engine AVM during a further ice shedding manoeuvre.

Spikes in the IP vibration in FIG. 10b appear to be a result of some of the ice entering the IP compressor. From the microphone data, and in particular the first order LP noise response, ice is progressively being shed from the fan blades which has the effect of changing the LP noise signature. This effect is much less apparent from the AVM-tracked LP vibration orders in FIG. 11b.

FIGS. 12a to 15b illustrate how a microphone can be used to give a much more sensitive indication of the fan condition. From the AVM tracked order plot in FIG. 12b we can see that asymmetric shedding of ice on the fan has caused LP vibration to rise to about 2.6 in/s before the engine was pulled back to a low level of vibration.

Figure 13B:
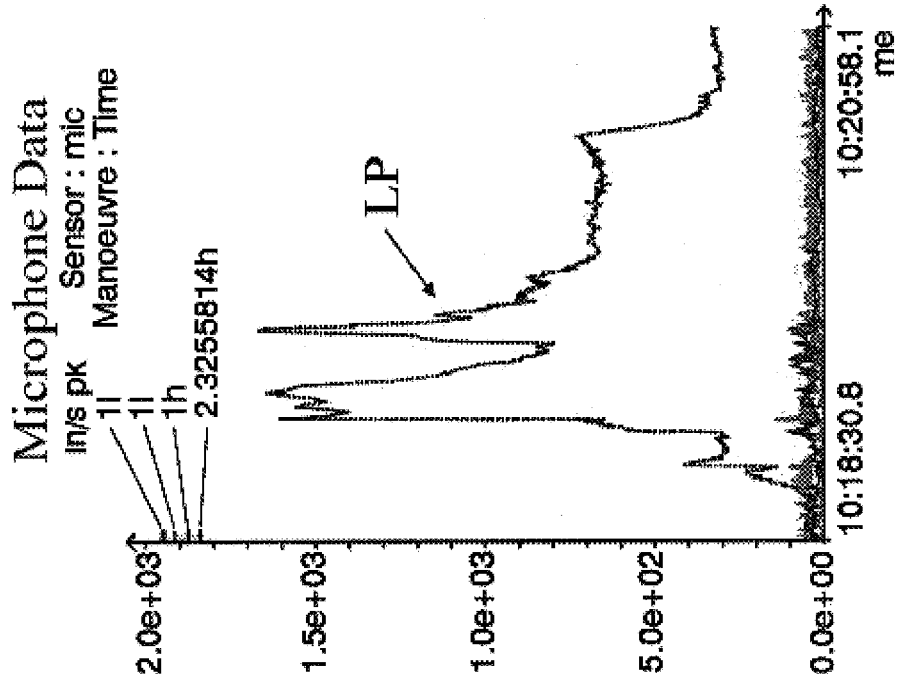
FIGS. 13a and 13b are respectively a noise signature plot and a tracked order plot recorded using an embodiment of the present invention during the ice shedding manoeuvre shown in FIGS. 12a and 12b.
Figure 13A:
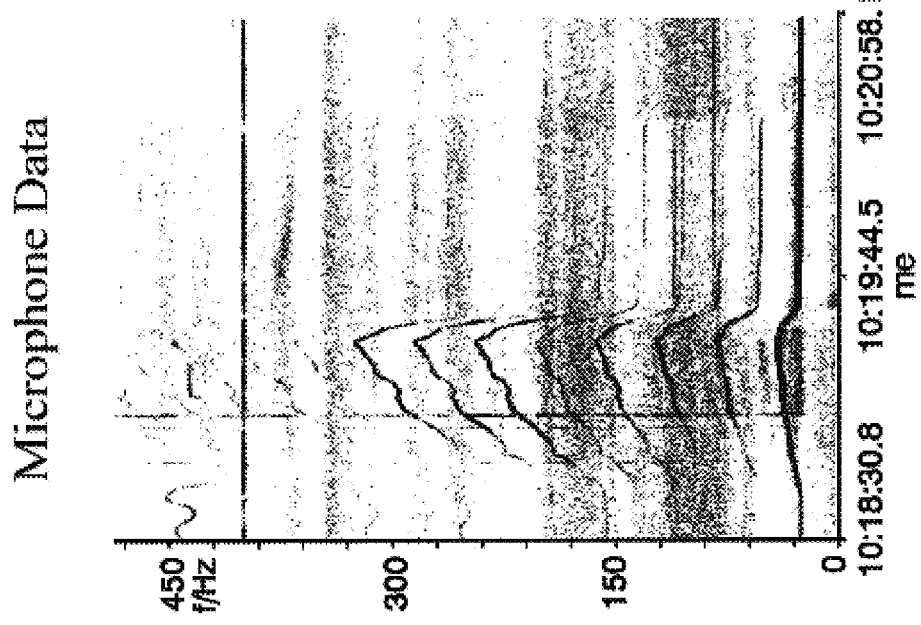
Figure 14A:
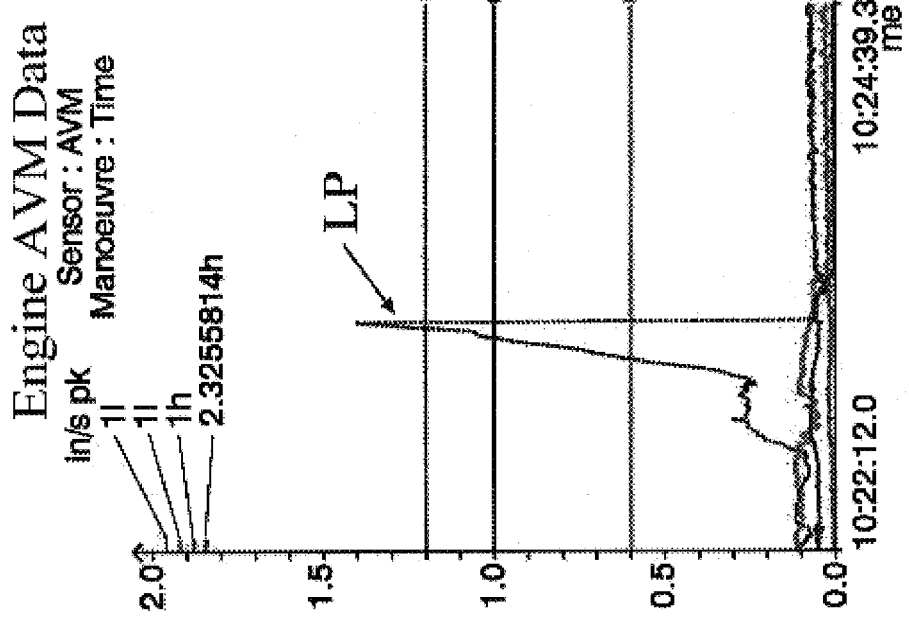
FIGS. 14a, 14b, 15a and 15b are respectively a vibration signature plot and a tracked order plot recorded using the engine AVM, and equivalent noise plots recorded using an embodiment of the present invention, during a subsequent ice shedding manoeuvre to that shown in FIGS. 12a, 12b, 13a and 13b.
Figure 14B:
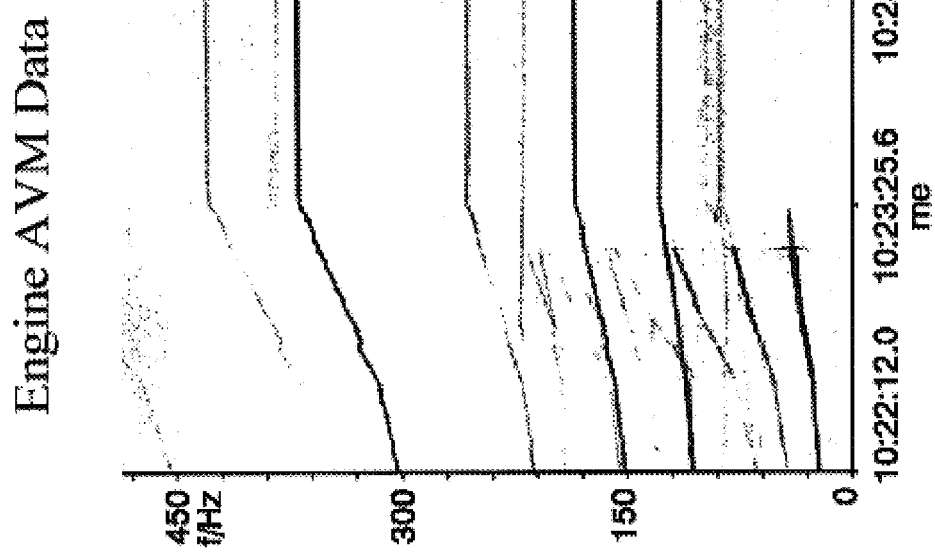
Figures 15A, 15B:
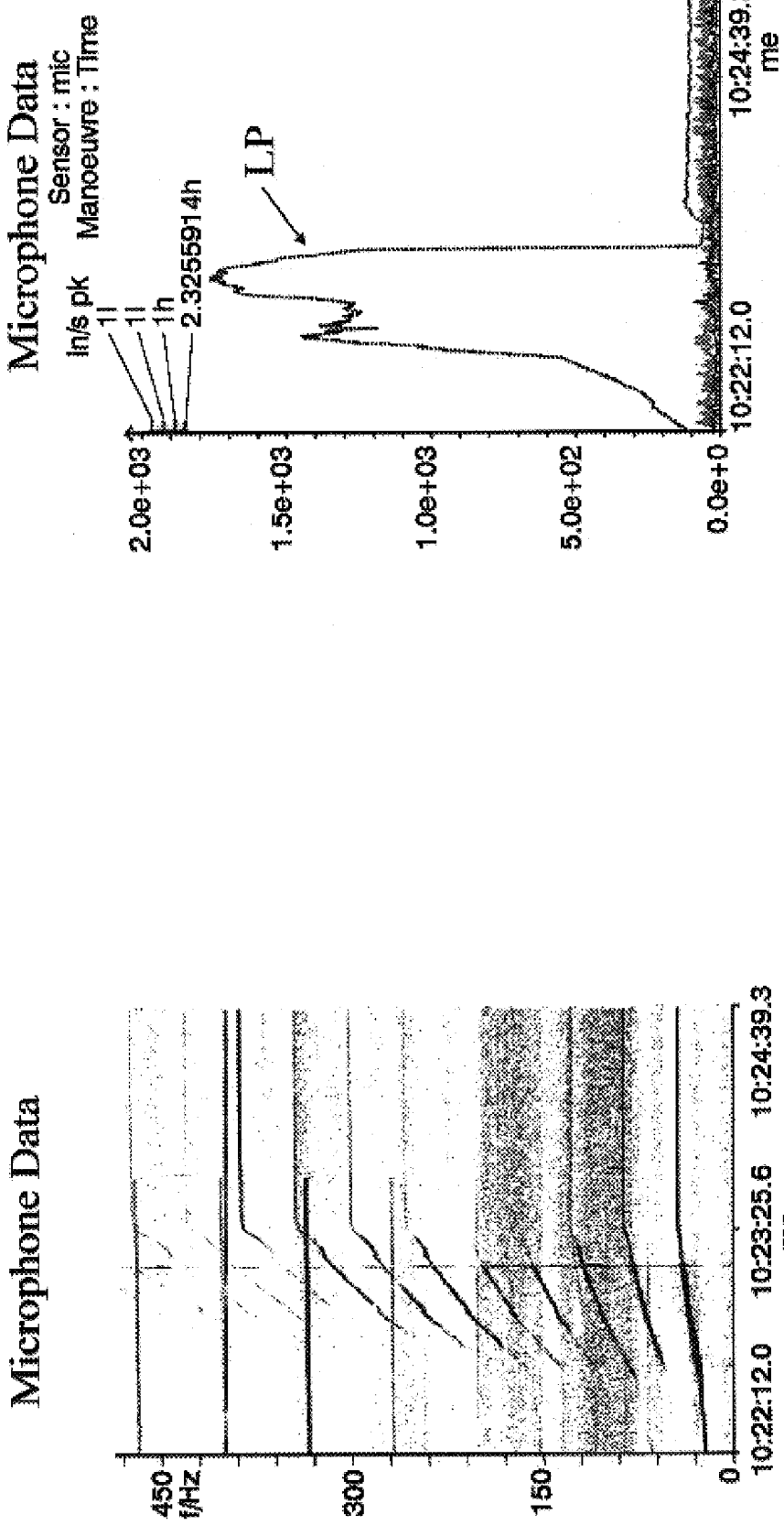

The microphone noise plot of FIG. 13a, and the tracked order plot of FIG. 13b quite clearly show (in particular through the first order LP tone at a high level in FIG. 13b) that the fan is still partially covered in ice, and that ice continues to shed from the fan even after pull back to the lower engine speeds, as illustrated by the sharp changes in the tracked order plot of FIG. 13b. The ice deposited on the surface of the fan blades causes this tone, which is much higher amplitude than that of a clean fan. As ice is shed from the fan, the amplitude of this tone reduces before dropping off significantly when all the ice has been shed off the fan.

The flight conditions for FIGS. 12a to 13b were: Air speed 180 to 200 knots; Altitude 17200 to 16850 feet; NL 51 to 84%; T20 267 K.

FIGS. 12a to 13b demonstrate that it should be possible to detect a damaged or cracked fan blade using an apparatus or method according to embodiments of the present invention. If one or more fan blades in a set have a different profile relative to the majority of the blades, then unusual noise tones will be generated. In the example shown, ice build up on a fan will not necessarily generate a significant tone/tones. However, if one or more blades were to shed a proportion of the built up ice, then a significant noise tone would be generated and could be detected. In a similar manner, if a blade is damaged or cracked, the fan would generate significant noise tone at shaft frequency and orders and harmonics thereof.

By contrast, the plots from FIGS. 14a to 15b show a complete ice shed where the vibration and noise signature drops back to the normal level, as recorded by both the engine AVM and the microphone, and indicated by a sudden drop in LP vibration and a similar drop in the first order LP noise.

The flight conditions for the plots in FIGS. 14a to 15b were: Air speed 165 to 162 knots; Altitude 16100 to 16600 feet; NL 31 to 90%; T20 267 K.

Figure 16:
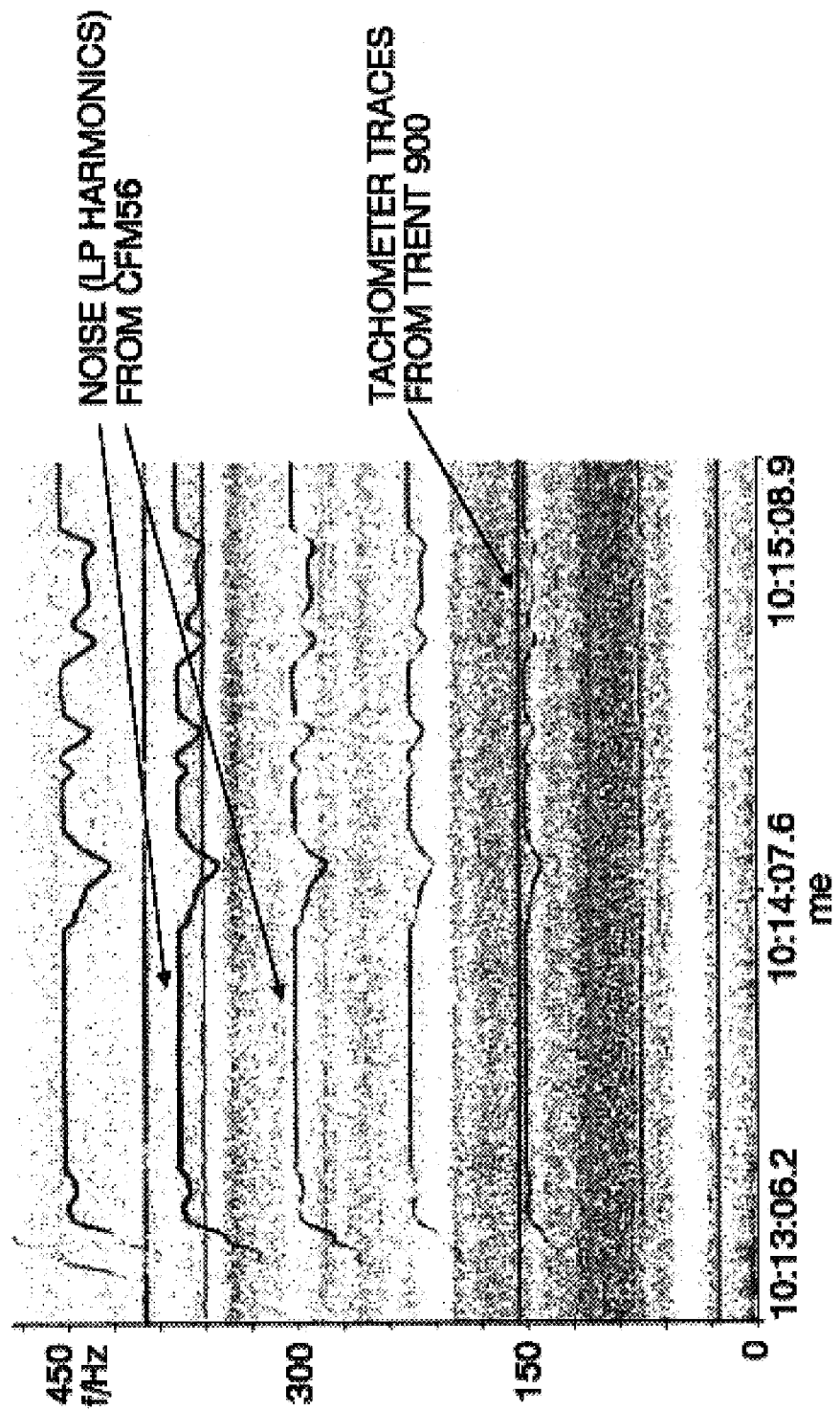
FIG. 16 shows the in-flight detection of fan damage to an adjacent engine recorded by an embodiment of the present invention.

FIG. 16 shows in-flight buzz saw noise coming from an adjacent engine, a CFM56 that sustained damage to the fan during the icing test flights referred to above (as noted by inspection following the test flight). The tachometer traces, which have been added to this plot, show that the Trent 900 engine that the microphone was arranged on was running at constant speed during the period shown, and so not responsible for this noise pattern. Therefore it appears that a microphone based health monitoring system is sufficiently sensitive and responsive in in-flight conditions to not only pick up changes in the operation of the engine in which it is mounted, but also in the operation of adjacent engines.

The following examples show how a microphone based health monitoring apparatus may improve a typical engine installation in a number of situations.

The Trent 700/800 dedicated generator can on occasion fail, and this appears to be initially by bearing fatigue followed by rubbing of the rotor in its stator. Conventional AVMs do not respond to relatively low vibration on the gearbox; they are aimed at the main engine rotors, and therefore will not detect this fault. However, it is possible that a microphone will pick up the bearing noise in a failing dedicated generator, and it is also quite likely that it will hear the contact of the rotor with the casing. With appropriately configured feature detectors, detection with up to 80% confidence could be achieved.

As can be seen from the Figures discussed above, the microphone is good at detecting changes to the fan blades. A single blade in the set with a different profile, for example from bird damage or blade cracking, will generate a significant first order signal. The fan will also have a characteristic energy distribution shown in the LP harmonics (buzz saw etc.), as seen when the CFM56 fan suffered damage (FIG. 16). Accordingly, an appropriately configured microphone based health monitoring system could detect fan blade damage with confidences near 100%.

The last example is fan flutter. In the final stages of failure the compressor blade (Fan, IP and HP front stages) is likely to generate a significant flutter tone. This tone is unlikely to be detected by an AVM because it does not affect the balance of the shaft. However, it will be heard quite clearly by a microphone, and hence can an appropriately configured microphone based health monitoring system could detect fan flutter with confidences near 100%.

Accordingly, whilst existing engine AVMs provide excellent transducers for monitoring the main rotors, they are not suitable for detecting vibration from the gearbox or accessories, or any other main rotor mechanism that does not significantly affect the rotating centre (balance), such as fan flutter. This deficiency is attributable to the typical mounting of an AVM on the end of one of the spokes on the intercase, so providing a hard path to all three location bearings. A microphone based health monitoring system provides a useful compliment to an AVM.

A further embodiment of the present invention provides a specific apparatus and method for monitoring the performance of bleed valves in a gas turbine engine.

In a gas turbine engine bleed valves are provided on the compressor side of the engine to prevent surging, and are operated to vent excess pressure to the exterior of the engine. On typical gas turbine engines there are between 5 and 7 such valves.

In the present embodiment, each bleed valve in a gas turbine engine is manufactured so that it has a different size aperture in its "open" position from the other bleed valves in the same engine.

A microphone is arranged and used to monitor the operation of the bleed valves in the engine. The arrangement of the microphone may be as described above in the embodiments of the invention, and arranged to monitor the whole of the engine, or may be specifically arranged to monitor the operation of the bleed valves.

Due to the distinct size of the aperture of each bleed valve, the sound produced by the operation of each bleed valve when open and venting pressure is distinct. Accordingly, the operation of the bleed valves can be monitored using the microphone, and in particular, problems with a particular bleed valve can be identified due to the known sound characteristics associated with each valve.

In alternative embodiments, the noise produced when each bleed valve is open may be produced by a noise generator located in the air flow through or outside each bleed valve. For example, a tuned pipe may be arranged adjacent to each bleed valve so that the air flow through that pipe causes the pipe to resonate at its fundamental frequency (and harmonics thereof). In other embodiments, a vibration member tuned to a particular resonant frequency may be provided in the air flow through each bleed valve. In further embodiments, tuned whistle or reed arrangements may be provided in the air flow. By providing tuned noise generators of different resonant frequencies adjacent each bleed valve, a distinct tone is produced during the operation of each bleed valve, which can be distinguished from the tones generated by the air flow through the other bleed valves.

Preferably the same type of noise generator is used in association with each bleed valve, but any mixture of any of the different types of noise generator would also be suitable.

In further embodiments, the present invention provides an apparatus and corresponding method for monitoring the health of aircraft systems other than engines. For example, the present invention provides an apparatus and corresponding method for monitoring the operation of a retractable undercarriage of an aircraft.

In this case, the microphone can be mounted in a wheel bay. When the landing gear is commanded to be deployed or stowed, the signature from the microphone is recorded and compared with an average signature generated during normal operation. The tones generated during deployment or stowage have distinct characteristics that can be recognised by a health monitoring system to which the microphone is connected and thus can be used to determine the health of the landing gear. For example, the characteristic fundamentals and harmonics of the vibration spectrum allow components to be identified, and timings, rates of change of amplitudes, relative peak amplitudes etc. can be used to create models of normality against which recorded signatures can be compared.

The concept can be extended to the monitoring of other aircraft systems which have characteristic operating sounds, such as movable control surfaces (e.g. wing flaps, tail flaps and rudders), or fuel pumping or measuring units.

While the present invention has been exemplified in the foregoing embodiments, the skilled person will realise that modifications and variations to those examples can be made without departing from the spirit and scope of the invention.

All references mentioned above are hereby incorporated by reference.

What is claimed is:

1. A gas turbine engine comprising a plurality of bleed valves, each of said bleed valves being configured such that, when open, that bleed valve produces a sound which is distinguishable from the sounds produced by other bleed valves.

2. An engine according to claim 1 wherein each bleed value is configured such that the sound produced by each bleed valve is, for a given pressure differential across the valve, a tone of substantially uniform pitch.

3. An engine according to claim 1 further comprising a noise generator associated with each bleed valve and located in an air flow through or out of each bleed valve, which generates the sound.

4. An engine according to claim 1 further comprising a health monitoring apparatus for monitoring the health of the engine, the apparatus including:
   a microphone arranged to receive sound from the bleed valves; and
   a processor adapted to process an output of the microphone.

5. A method for monitoring the operation of one or more bleed valves in a gas turbine engine, wherein the engine has a plurality of bleed valves, each of said bleed valves being configured such that, when open, the bleed valve produces a sound which is distinguishable from the sounds produced by the other bleed valves, wherein the sound detected by a microphone includes the sound produced by said bleed valves, the method including the steps of:
   monitoring an output of the microphone arranged to receive the sounds produced by said bleed valves; and
   processing the output of the microphone.

6. A method according to claim 5 wherein the sound produced by each bleed valve is generated by a noise generator associated with each bleed valve and located in an air flow through or out of said bleed valve.

7. An engine according to claim 4 wherein the processor is adapted to filter random noise from the output of the microphone.

8. An engine according to claim 4 wherein the processor is adapted to analyze the output of the microphone.

9. An engine according to claim 4 wherein the processor is adapted to compare the output of the microphone with a model of a normal behavior of the engine.

10. An engine according to claim 9 wherein the processor is further adapted to produce an alarm or an alert if the output of the microphone deviates from the model by more than a pre-defined limit.

11. An engine according to claim 4 wherein the microphone is located in an under-cowl location.

12. A method according to claim 5 wherein said step of processing includes one or more of the following: removal of random noise, filtering, calculation of power spectra, zmod data, spectrum analysis, tracked order extraction, amplitude and phase extraction.

13. A method according to claim 5 including the further step of analyzing the output of the microphone.

14. A method according to claim 13 wherein the step of analyzing the output of the microphone includes the step of comparing the output with a model of a normal behavior of the system.

15. A method according to claim 14 including the further step of generating an alarm or an alert if the output deviates from the model by more than a pre-defined limit.

16. A method according to claim 5 further including the step of providing the microphone in an under-cowl location.

17. A method according to claim 5 wherein the bleed valves are configured such that the sound produced by each bleed valve is, for a given pressure differential across the valve, a tone of substantially uniform pitch.

* * * * *

UNITED STATES PATENT AND TRADEMARK OFFICE
CERTIFICATE OF CORRECTION

PATENT NO. : 7,591,183 B2 Page 1 of 1
APPLICATION NO. : 11/499809
DATED : September 22, 2009
INVENTOR(S) : Dennis M King It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 259 days.

Signed and Sealed this

Twenty-first Day of September, 2010

David J. Kappos
*Director of the United States Patent and Trademark Office*